United States Patent [19]

Schweiger

[11] Patent Number: 4,816,209
[45] Date of Patent: Mar. 28, 1989

[54] METHOD AND APPARATUS FOR SEPARATING RADIOACTIVE CONSTITUENTS FROM GAS OR VAPORS ESCAPING ACCIDENTALLY FROM NUCLEAR REACTORS

[75] Inventor: Fritz Schweiger, Denzlingen, Fed. Rep. of Germany

[73] Assignee: Hochtemperatur-Kernkraftwerk (HKG) Gemeinsames Europäisches Unternehmen, Hamm, Fed. Rep. of Germany

[21] Appl. No.: 890,834

[22] Filed: Jul. 25, 1986

[30] Foreign Application Priority Data

Jul. 30, 1985 [DE] Fed. Rep. of Germany ....... 3527163

[51] Int. Cl.$^4$ .................... G21C 9/00; B01D 47/02
[52] U.S. Cl. .................... 376/309; 376/310; 376/312; 55/255; 55/267; 55/DIG. 9
[58] Field of Search ........... 55/255, 248, 256, 222, 55/267; 376/310, 312, 309, 370, 371

[56] References Cited

U.S. PATENT DOCUMENTS

| | | | |
|---|---|---|---|
| 1,594,324 | 7/1926 | Payne | 55/256 X |
| 3,382,153 | 5/1968 | Bigge et al. | 376/371 X |
| 3,844,748 | 10/1974 | Lanier | 55/255 |
| 3,937,649 | 2/1976 | Ridgely | 376/310 |
| 4,155,977 | 5/1979 | Baker | 55/256 X |
| 4,661,312 | 4/1987 | Schweiger | 376/283 |

FOREIGN PATENT DOCUMENTS 2049792 4/1972 Fed. Rep. of Germany ...... 376/309
2931140 6/1984 Fed. Rep. of Germany .

Primary Examiner—John F. Terapane
Assistant Examiner—John S. Maples
Attorney, Agent, or Firm—Toren, McGeady & Associates

[57] ABSTRACT

To separate tritium from gases and/or vapors escaping accidentally from a nuclear reactor, before the gases or vapor are discharged into the atmosphere, the gases or vapor are fed through a line 5 into a reservoir 3 of deionized light water which is maintained at its boiling point in a heat insulated vessel 1. The tritium is accumulated in the water in the reservoir 3 and any tritium which passes from the reservoir 3 in light water steam is condensed by surface condensors 8 in a steam dome 9. Any possible residue of tritium in the steam leaving through an outlet 10 at the top of the dome 9 is separated out in the form of droplets by a drier cyclone connected directly downstream of the outlet 10.

5 Claims, 1 Drawing Sheet

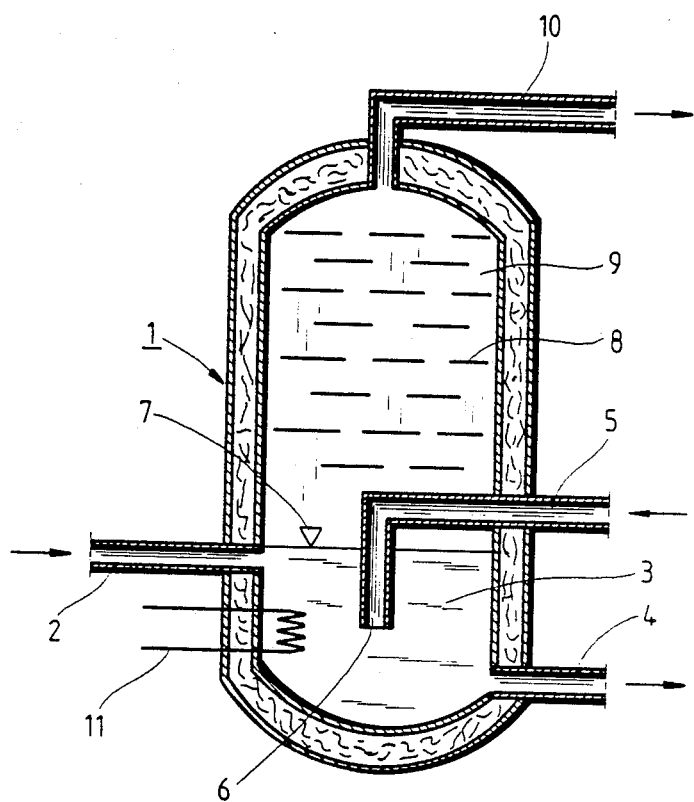

METHOD AND APPARATUS FOR SEPARATING RADIOACTIVE CONSTITUENTS FROM GAS OR VAPORS ESCAPING ACCIDENTALLY FROM NUCLEAR REACTORS

This invention relates to methods of separating radioactive constituents from gases and/or vapours escaping accidentally from a nuclear reactor before the gases and/or vapours are blown into the atmosphere. It also relates to an apparatus for carrying out this method.

In such a method described in German Patent Specification No. 29 31 140, a liquid reservoir which serves as an excess-pressure valve for the accidentally discharged radioactive vapours and/or gases is provided between a pressure vessel of the reactor and/or a protective vessel (containment) of the reactor on the one hand and a pressure-relief station having a washing cyclone and a drier cyclone on the other hand. The pressure-relief station must, according to operating rules, operate only in the case of an accident, e.g. when a fairly large quantity of radioactively contaminated coolant escapes in the containment due to leakage in the coolant circuit. In normal operation of the reactor, in contrast, a slight sub-atmospheric pressure is maintained in the containment, preferably for preventing the escape of radioactive gases and vapours at personnel and material entry locks. The pressure-relief station, through which clean coolant, that is to say coolant cleansed of radioactive constituents, is to be discharged to the atmosphere, is therefore closed off in fault-free reactor operation from the atmosphere of the reactor pressure vessel, or from the discharge gas line of a conventional excess-pressure valve of the reactor pressure vessel, by a water reservoir which serves as an excess-pressure valve. According to the method disclosed in German Patent Specification No. 29 31 140, washable fission products, such as caesium, strontium and barium, and also radioactive substances that can only be washed out to a limited extent or with difficulty, such as gaseous iodine, zenon and krypton, can be separated, but tritium cannot.

Tritium ($_1H^3 = T$), the heaviest isotope of hydrogen, is a radioactive beta-emitter, which evolves in nuclear reactors in various radioactive processes. It breaks down with a half-life of 12,346 years to $_2He^3$. The break down energy is approximately 0.02 MeV. Tritium can lead to a problem if it is released in fairly large quantities. This can conceivably happen in graphite-moderated, gas-cooled reactors. The graphite inventory of the fuel elements in such a reactor is, for example, 120 tonnes, having, with a specific inner surface of 6 $m^2/g$, a total graphite internal surface amounting to approximately 720 $km^2$. Over such a large area, correspondingly large quantities of tritium can be deposited which, after a water inflow—e.g. due to a pipe rupture at a steam generator of the reactor—are absorbed by molecules of light water, so that the water molecules HTO or $T_2O$ form by an exchange reaction of $H_2O$ and T or $T_2$.

The object of the present invention is to separate the tritium content from the gases and/or vapours which are subsequently blown off to atmosphere as the result of an accident.

To this end, according to one aspect of the present invention, in a method of separating radioactive constituents from gases and/or vapours escaping accidentally from a nuclear reactor before the gases and/or vapours are blown into the atmosphere, tritrum (T) contained in the gases or vapours in the form of HTO and/or $T_2O$ is concentrated in a reservoir of deionate by blowing the gases or vapours into the deionate in the reservoir, the deionate being maintained at the boiling temperature of light water, and by condensing HTO or $T_2O$ vapour molecules coming from the deionate in the reservoir on humidity separators or surface condensers adjusted to the boiling temperature of light water and by precipitation of $H_2O/HTO$ or $H_2O/HTO$ - water droplets, and the HTO or $T_2O$ molecules not accumulated in the deionate reservoir are separated in a drier cyclone before the gases and/or vapour are blown into the atmosphere.

By the method of the invention, the result is surprisingly achieved of washing out $T_2O$ or HTO with ordinary water ($H_2O$) from $H_2O$ steam. Use is made of the feature that the boiling temperatures for the heavy water types HTO and $T_2O$ at atmospheric pressure are about 1.5° to 2° higher than that of light water. At the boiling temperature of light water, that is with dry, saturated light water steam, HTO or $T_2O$ steam molecules will condense and precipitate on $H_2O$ molecules to form condensation nuclei. These condensation droplets can be retained with a light water reservoir at boiling temperature and/or be centrifuged with a drier cyclone from the steam.

The invention also consists, according to another of its aspects, in apparatus for separating radioactive constituents from gases and/or vapours escaping accidentally from a nuclear reactor before the gases and/or vapours are blown off into the atmosphere, the apparatus comprising a vessel for separating tritium from the gases and/or vapours, the vessel comprising a sump containing a reservoir of deionate, means for maintaining the temperature of the deionate at the boiling temperature of light water, means for supplying the gases and/or vapours containing tritium below the surface of the deionate in the sump, a steam dome provided with moisture separators or surface condensers disposed above the sump, a gas and/or vapour outlet at the top of the steam dome, and a drier cyclone communicating with the outlet.

The drier cyclone is preferably connected directly downstream of the outlet from the steam dome. The vessel should, if at all possible have a heat insulated wall. It is furthermore favourable if the deionate reservoir has a feed for the deionate adjusted to the boiling temperature of light water and a discharge for the deionate enriched with HTO or $T_2O$. That is to say the reservoir is constructed as a straight-through flow sump.

In the apparatus in accordance with the invention, the expense and complication of equipment for washing out the gas and/or steam quantities released is relatively small, but the equipment is still more favourable if a turbine house of the reactor can also be connected to the same gas/steam washing plant. Since the separation of the different steam generator units with the selector circuits and the precautions against consequential damage in the case of pipe fracture, the dividing of the feedwater tanks and other precautions can the be dispensed with, the investment costs for the washing plant are small compared with the savings alone at the steam generators. If all the other radioactive impurities are separated, for example by the method described in German Patent Specification No. 29 31 140, the secondary circuit of the nuclear reactor together with steam generators can be conventionally designed, and the reactor pressure vessel can, as in the conventional case, contain a device which blows down in the event of an accident via a washing plant.

An example of a method and of apparatus in accordance with the invention will now be described with reference to the accompanying drawing which is a diagrammatic side view of the apparatus.

The apparatus comprises a vessel 1, preferably having a double wall filled with insulation. The vessel has a deionate feed line 2, for feeding deionised water for example to a sump 3 with an outlet 4 and it also has a steam feed line 5 for introducing $H_2O$, HTO and $T_2O$ vapour. The outlet 6 of the feed line 5 terminates below the water level 7 of the sump 3. Above the water level 7, moisture separators or surface condensers 8 are disposed in the vessel 1, which is formed in this region as a steam dome 9. These condensers or moisture separators are plates preferably installed at an angle, especially perpendicularly, to the flow direction. The steam dome 9 has at its top a steam outlet 10. The sump 3 is supplied via the feed line 2 preferably with deionate already heated to boiling temperature. Additionally, a heater 11 for maintaining the boiling temperature may be provided in the sump.

The mixture of $H_2O$, HTO and $T_2O$ vapour to be purified is blown via the feed line 5 into the boiling deionised water reservoir formed by the sump 3. Water shocks are not to be expected, because $H_2O$ is not condensed but only possibly HTO and $T_2O$. The important aspect is that the deionate in the sump 3 is maintained at light water boiling temperature for example by the electrical heater 11 which is thermostatically controlled. A portion of the HTO and/or $T_2O$ is retained in the sump 3.

HTO and $T_2O$ molecules, which evaporate again below their boiling point from the sump 3 due to so-called pre-evaporation, are condensed out in the steam dome 9, equipped with the moisture separators or surface condensers 8 at light water boiling temperature, after they have formed condensation nuclei with the $H_2O$ molecules. Any possible residue of HTO or $T_2O$ molecules can be supplied with water droplets via the steam outlet 10 from the dome 9 to a drier cyclone connected downstream of the vessel 1 and be centrifuged out there. The light water steam; purified of its radioactive contents, can be blown off to atmosphere.

In the apparatus according to this invention, the radioactivity originating from the tritium is concentrated in the vessel sump and in this manner a release to atmosphere is prevented by the use of relatively simple and inexpensive means. It is important to note that the principal retention of tritium takes place not in the evaporation of the deionate reservoir but in the condensation in the steam dome and possibly also in the centrifuging of the moisture in the cyclone or the like connected downstream.

I claim:

1. A method of separating radioactive constituents in the form of tritium from gases or vapours which escape accidentally from a nuclear reactor before the gases or vapours are blown into the atmosphere, said tritium being contained in the gases in the from of HTO and/or $T_2O$, the method comprising the steps of maintaining a reservoir of deionate, maintaining said deionate at the boiling temperature of light water, concentrating said tritium in said reservoir of deionate by the steps of (a) blowing said gases or vapours from said nuclear reactor into said deionate through a feedline, which feedline opens below the surface of said dionate in said reservoir, (b) providing humidity separators or surface condensers above said reservoir, (c) adjusting the temperature of said humidity separators or surface condensers to the boiling temperature of light water, (d) condensing HTO or $T_2O$ vapour molecules evaporated from said deionate in said reservoir on said humidity separators or surface condensers, and (e) precipitating $H_2O$/HTO or $H_2O$/HTO-water droplets, providing a drier cyclone and separating HTO and $T_2O$ molecules not accumulated in said deionate reservoir in said drier cyclone before said gases and/or vapour are blown into the atmosphere.

2. Apparatus for separating radioactive constitutents in the form of tritium from gases and/or vapours escaping accidentally from a nuclear reactor before said gases and/or vapours are blown into the atmosphere, said tritium being contained in the gases in the form of HTO and/or $T_2O$, said apparatus comprising a vessel for separating said tritium from said gases and/or said vapours, said vessel including a sump, a reservoir of deionate in said sump, means for maintaining the temperature of said deionate in said sump at the boiling temperature of light water, means for supplying said gases and/or vapours from said nuclear reactor containing tritium through a feedline, which feedline opens below the surface of said deionate in said sump, a steam dome, moisture separators or surface condensors disposed above said sump in said steam dome, a gas and/or vapour outlet at the top of said steam dome, a drier cyclone and means communicating said outlet with said drier cyclone.

3. Apparatus as claimed in claim 2, in which said drier cyclone is connected to said outlet directly downstream thereof.

4. Apparatus as claimed in claim 2, further comprising a heat insulated wall surrounding said vessel.

5. Apparatus as claimed in claim 2, in which said vessel further comprises a feed line for supplying said deionate to said reservoir and a discharge line for discharging said deionate with said HTO or $T_2O$ concentrated therein from said reservoir.

* * * * *